United States Patent
Allen

(10) Patent No.: US 9,497,023 B1
(45) Date of Patent: Nov. 15, 2016

(54) MULTIPLY-ENCRYPTED MESSAGE FOR FILTERING

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 13/830,308

(22) Filed: Mar. 14, 2013

(51) Int. Cl.
 *G06F 21/64* (2013.01)
 *H04L 9/08* (2006.01)
 *G06F 21/56* (2013.01)

(52) U.S. Cl.
 CPC ...................................... *H04L 9/08* (2013.01)

(58) Field of Classification Search
 None
 See application file for complete search history.

(56) References Cited

U.S. PATENT DOCUMENTS

| | | | |
|---|---|---|---|
| 7,216,233 B1* | 5/2007 | Krueger | 713/176 |
| 2004/0194027 A1* | 9/2004 | Suzuki | G06F 17/218 715/209 |
| 2005/0204009 A1* | 9/2005 | Hazarika | G06Q 10/107 709/206 |
| 2005/0240762 A1* | 10/2005 | Mao | 713/168 |
| 2007/0022293 A1* | 1/2007 | Hayashi et al. | 713/176 |
| 2007/0198483 A1* | 8/2007 | Li et al. | 707/3 |
| 2009/0106552 A1* | 4/2009 | Mohamed | 713/165 |
| 2010/0281538 A1* | 11/2010 | Yu | G06Q 10/107 726/22 |
| 2011/0191847 A1* | 8/2011 | Davis et al. | 726/22 |
| 2012/0063597 A1* | 3/2012 | Tropp et al. | 380/259 |

OTHER PUBLICATIONS

Adaptive Spam Filtering Based on Fingerprint Vectors. Liu et al. ISECS(2008).*
A Reputation-Based Approach for Efficient Filtration of Spam. Prakash et al. Cloudmark White Paper(2006).*
A Spam Filtering Techique Based on Feature Fingerprint. Shi et al. IEEE(2010).*
Traffic classification-based spam filter. Zhang et al. IEEE(2006).*

* cited by examiner

*Primary Examiner* — Venkat Perungavoor
(74) *Attorney, Agent, or Firm* — Baker & Hostetler LLP

(57) ABSTRACT

A multiple encryption mechanism is described. In an embodiment, an encrypted electronic message and a first decryption key of a public-private key group is received. The first decryption key is operable to decrypt a set of properties for the encrypted electronic message without decrypting the encrypted electronic message. The encrypted electronic message and the set of message properties are encrypted using one or more encryption keys of the public-private key group. The set of properties for the encrypted electronic message is decrypted using the first decryption key. Using the decrypted set of properties, it is determined whether the encrypted electronic message should be flagged as a specified type of electronic message.

19 Claims, 7 Drawing Sheets

MULTIPLY-ENCRYPTED MESSAGE FOR FILTERING

BACKGROUND

Detection of unwanted communications, compromised data, and malware has been an increasing concern as networked communication continues to grow at tremendous rates. With the growth of communication networks such as the Internet, the increasing amount of data interchange, and more recently the growth of cloud computing, the vulnerability of computers and servers through networked communication has become an increasingly significant issue. In particular, electronic mail communication has been plagued by high volumes of junk mail (e.g., spam and other unsolicited communications) as well as malicious communications (malware, phishing attempts, and other maliciously crafted electronic content). Some filtering solutions have been developed to combat these unwanted communications. For example, service providers have used heuristic detection and filtering to identify and quarantine unwanted communications. These heuristic approaches may rely on granting to a service provider access to messaging content to perform the filtering. While a user may employ encryption or other security measures to protect messages in transit, the user is not provided privacy from the service provider because the service provider requires access to the original message.

DETAILED DESCRIPTION

In general, this disclosure describes using multiple encryption levels for electronic messages in order to reduce the amount of information that a user needs to disclose to a messaging service provider in order to filter the electronic messages. In one embodiment, an encryption-decryption key pair may be generated for a user. The encryption-decryption key pair may include multiple decryption keys. A first decryption key operable to decrypt a limited set of message properties needed for message filtering may be distributed to the service provider. A second decryption key operable to decrypt the entire message may be distributed to the user. The encryption-decryption key pair may also have an associated verification function permitting the user to verify that the limited set of message properties were correctly generated without requiring the user to possess a copy of the first private key. The service provider may use the limited set of message properties to filter messages. The limited set of message properties provides sufficient information to determine if a message should be filtered (e.g., determine if the message is a spam message), without giving the service provider access to the entirety of the associated message. It should be appreciated that while the present disclosure describes embodiments in the context of electronic mail delivery, the principles described may be applied to other types of messaging and communications where encryption and filtering may be desired.

Figure 1:
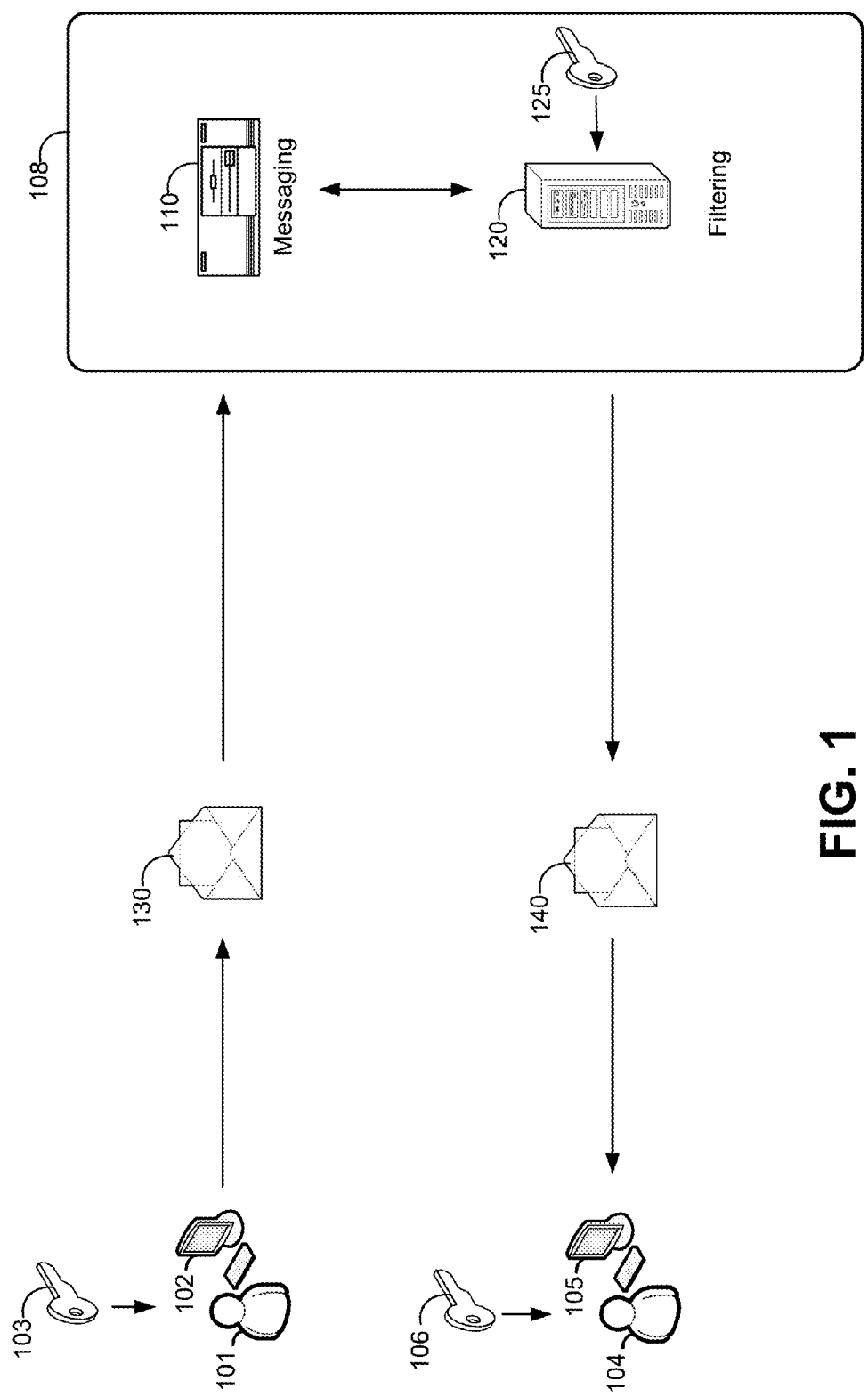
FIG. 1 is a diagram illustrating an encrypted message mechanism in accordance with the present disclosure.

FIG. 1 illustrates one example embodiment of a multiple encryption mechanism in accordance with the present disclosure. FIG. 1 illustrates a messaging service 110 and a filtering service 120 in a service provider network 108 that are configured to provide filtered messaging services to users such as computer user 101 operating a computing device 102 and computer user 104 operating a computing device 105. Computer user 101 may desire to send an electronic mail message to computer user 104. Messages from computing device 102 may be encrypted using an encryption key 103. An encrypted message 130 may be sent to computer user 104 via service provider 108. Messaging service 110 may receive the encrypted message 130 and communicate with filtering service 120 to determine if the encrypted message 130 should be deleted, quarantined, or otherwise marked as an unwanted message. Filtering service 120 may use a decryption key 125 to generate a set of properties for the encrypted message 130. The set of properties may provide sufficient information for the filtering service 120 to identify whether the encrypted message 130 exhibits characteristics sufficient to be flagged as an unwanted message with a predetermined degree of confidence. The filtering service 120 may provide an indication of the flagging to the messaging service 110. The messaging service 110 may append the information from the filtering service 120 and send the flagged and encrypted message 140 to computer user 104 via computing device 105. Computer user 104 may use a decryption key 106 to decrypt flagged and encrypted message 140. However, based on the configuration of computer user 104's messaging service, which may be provided by service provider 108 or a different service provider, the flagged and encrypted message 140 may be deleted, placed in a spam folder, or otherwise isolated if the message 140 is flagged as being an unwanted message.

In general, filtering is one method of protecting users from unwanted electronic mail such as spam. Such unwanted electronic mail typically involves messages sent to large numbers of recipients. The unwanted electronic mail may contain advertisements, hyperlinks that navigate to phishing sites or sites that are hosting malware and other malicious content, or malware such as executable file attachments. Some methods for filtering unwanted electronic mail may include message filtering based on the content of the email. Message filtering may involve processing an electronic mail message to classify the message according to specified criteria. Message filtering software may allow an electronic mail message to continue delivery to its destination unchanged. The message filtering software may also edit the message, redirect the message to a different location, or discard the message. The message filtering software may process a message using various techniques such as applying one or more tests for spam. For example, the message filtering software may scan the text of a message for known spam patterns such as by identifying certain words or expressions, assigning a score to each message based on the identifications, and if the score is above a predetermined value, the message may be flagged as a spam message. Message filtering may also involve using more complex methods such as statistical filtering, where messages may be marked as spam based on identification of specific statistical patterns in the messages based on word usage.

One drawback of message filtering is that a filtering service must access the contents of a message in order to apply a filtering technique as described above. If a user wishes to securely send a message using encryption, the filtering service will not be able to apply filtering techniques unless the filtering service is provided the keys to decrypt the message. Various aspects of the disclosure will now be described with regard to certain examples and embodiments, which are intended to illustrate but not to limit the disclosure. In the following detailed description, references are made to the accompanying drawings that form a part of the detailed description, and that show, by way of illustration, specific embodiments or examples. The drawings herein are not drawn to scale. Like numerals represent like elements throughout the several figures.

Figure 2:
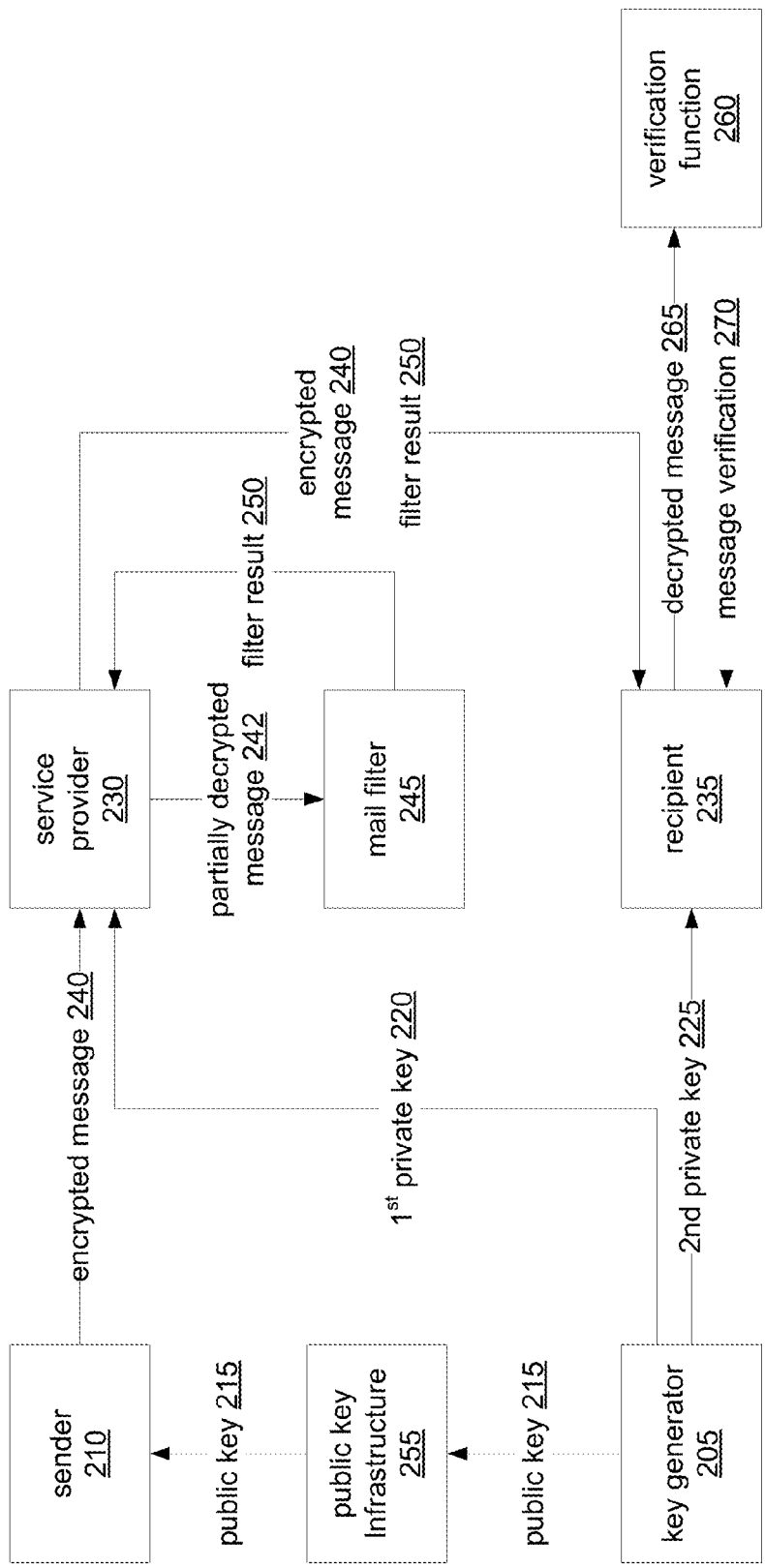
FIG. 2 is a diagram illustrating an encrypted message mechanism in accordance with the present disclosure.

In various embodiments described herein, systems and methods are described for message filtering using a multiply-encrypted message. FIG. 2 illustrates an example system for confidential mail filtering using a multiply-encrypted message. Referring to FIG. 2, a key generator 205 may construct a public-private key pair for a message recipient including at least a public key 215 for encrypting a message, a first private key 220 for partially decrypting the message, and a second private key 225 for fully decrypting the message. The key generator 205 may distribute the public key 215 to a sender 210, for example by distributing the public key 215 using a public key infrastructure 255. The key generator 205 may distribute the first private key 220 to a service provider 230 contracted to perform message filtering on behalf of a recipient 235. The key generator 205 may distribute the second private key 225 to the recipient 235.

The sender 210 may send an encrypted message 240 that was encrypted using the public key 215 to the recipient 235 via the service provider 230. In one embodiment, the public-private key pair may include a pair of encryption keys E1 and E2 and a pair of decryption keys D1 and D2 where $D1(E1(X))=X$ and $D2(E2(X))=X$ for any input X. For example, a message encrypted using encryption key E1 may be decrypted using decryption key D1, and a message encrypted using encryption key E2 may be decrypted using decryption key D2. The sender 210 may cause generation of a message M and a message thumbprint T(M) of salient properties for message M. In one embodiment, the message thumbprint T(M) may preserve certain properties of the message M without allowing for the possibility of reconstructing the message M from the thumbprint T(M). In some embodiments, the thumbprint T(M) may preserve statistical properties that allow a specially-designed heuristic to make filtering decisions that are consistent, to some predetermined degree of confidence, with filtering decisions that would be made based on the original message.

In one embodiment, thumbprint T(M) may consist of a dictionary of the words in message M. For example, thumbprint T(M) may include at least a subset of the words contained in the message M such that the subset can be analyzed to detect presence of one or more indications of a spam message. The subset can also be analyzed to perform statistical analysis on the words in the subset. In another embodiment, thumbprint T(M) may consist of a weighted suffix tree based on the words in message M, wherein the weighted suffix tree includes the suffixes of the message content in a way that allows for implementation of various search operations. In other embodiments, thumbprint T(M) may consist of a Markov model based on message M or some other probabilistic model.

In one embodiment, the sender 210 may construct a message by concatenating message M and thumbprint T(M). For example, a multi-part Multipurpose Internet Mail Extensions (MIME) message may be generated with a first message part containing the message M encrypted with encryption key E1 (i.e., E1(M)) and a second message part containing the thumbprint T(M) encrypted with encryption key E2 (i.e., E2(T(M)). The multi-part MIME message may then be sent to the recipient 235. In another embodiment, the sender 210 may cause generation of a message concatenating message M and thumbprint T(M) using onion layering by encrypting the message M using encryption key E1, concatenating encrypted message M with thumbprint T(M), and encrypting the concatenated message using encryption key E2 (i.e., $E2(E1(M)+T(M))$).

In another embodiment, the public-private key pair may include a single encryption key E and a pair of decryption keys D1 and D2 where $D1(E(X))=X$ for any input X. For example, a message encrypted using encryption key E may be decrypted using decryption key D1. Applying the decryption key D2 to the same encrypted input E(X) may generate a partially-obscured input $D2(E(X))=X'$. Partially-obscured input X' may preserve certain properties of the input X such that partially-obscured input X' may be used as a thumbprint of the message. For example, partially-obscured input X' may contain at least some of the trigrams of input X without preserving their order and allow for statistical analysis of the encrypted message without allowing for the possibility of reconstructing input X using X'. In this embodiment, the sender 210 may generate a message M, encrypt the message using encryption key E to generate message E(M), and send the message E(M) to recipient 235. Service provider 230 may use decryption key D2 to generate partially-obscured input $D2(E(X))=X'$ and use partially-obscured input X' as a message thumbprint.

The service provider 230 may partially decrypt the encrypted message 240 using the first private key 220 to generate a partially decrypted message 242. In one embodiment, the service provider 230 may run the partially decrypted message 242 through a mail filter 245 to generate a filter result 250. For example, the service provider 230 may wish to provide a message filtering service that attempts to filter junk mail, spam, malware, or other unwanted communications. In one embodiment, the service provider 230 may provide mail filter 245 as part of its services. In other embodiments, the service provider 230 may interact with an outside service that provides access to mail filter 245 as a contracted service. Service provider 230 may send the partially decrypted message 242 to mail filter 245 to perform filtering based on the partially decrypted message 242.

In one embodiment, the service provider 230 may generate a message thumbprint based at least in part on the encrypted message 240 and the first private key 220. The service provider 230 may use the message thumbprint as input to the mail filter 245. The service provider 230 may receive a filter result 250 from mail filter 245. The filter result 250 may comprise data indicative of the result of running mail filter 245 on the message thumbprint, such as a Boolean flag indicating whether the encrypted message 240 is suspected of being an unwanted message.

In one embodiment, the service provider 230 may package the encrypted message 240 with filter result 250 for sending to the recipient 235. For example, the filter result 250 may be attached to the encrypted message 240 using a message header, and the packaged message may be sent to the recipient.

In an embodiment, the service provider 230 may take one or more actions in response to receiving filter result 250. If filter result 250 indicates that the encrypted message 240 is an unwanted message, then the service provide 230 may quarantine the encrypted message 240 or delete the encrypted message 240. In this embodiment, any message forwarded to the recipient 235 by the service provider 230 may be assumed to not be flagged as an unwanted message and the service provider 230 is not explicitly required to include the filter result 250 in the forwarded messages.

The recipient 235 may fully decrypt the encrypted message 240 using the second private key 225. In some embodiments, the recipient 235 may cause execution of a verification function 260 using the encrypted message 240 and fully decrypted message 265 to confirm that the partially decrypted message 242 correctly represented the message thumbprint of the encrypted message 240.

In one embodiment, the recipient 235 may receive an encrypted message 240 and the message thumbprint from the service provider 230. In some embodiments the message thumbprint may be encrypted. The recipient 235 may decrypt the encrypted message 240 using the second private key 225 to generate the original message. The recipient 235 may send the decrypted message 265 to the verification function 260 which may independently generate a message thumbprint based on the decrypted message 265. The verification function 260 may independently encrypt the message thumbprint using the public key 215. The verification function 260 may compare the independently generated encrypted message thumbprint with the encrypted thumbprint provided by the service provider 230 to verify that the provided encrypted thumbprint was correctly generated.

In another embodiment, the recipient 235 may receive an encrypted message 240 from the sender 210 and a message hash from the service provider 230. The service provider 230 may hash the message thumbprint received from the sender 210 and forward the hash to the recipient 235 by, for example, including the hash with the filter result 250. The recipient 235 may decrypt the encrypted message 240 to produce the decrypted message 265 and send the decrypted message 265 to verification function 260. The verification function 260 may independently generate a message thumbprint based on the original message, hash the message thumbprint, and then compare the independently computed hashed message thumbprint with the received hashed message thumbprint to verify the received hashed message thumbprint.

The recipient 235 may make a message delivery determination based in part on the filter result 250 and message verification result 270. For example, the recipient 235 may choose to discard messages that fail the verification function 260. Alternatively, the recipient 235 may choose to quarantine or discard messages that pass the verification function 260 but are otherwise indicated as being an unwanted message based on the filter result 250.

The examples illustrated in FIGS. 1 and 2 describe embodiments in the context of an electronic message delivery infrastructure configured to deliver messages from a sender to a recipient via one or more service providers in communication with a message filtering service. However, the described principles may be used to provide secure message delivery with message filtering in other contexts. For example, in other embodiments, multiple encryption techniques as those discussed above may be used with filtering techniques to categorize encrypted data packets, data units, or data files by using encrypted thumbprints to identify salient properties of the encrypted data without compromising the encrypted data.

Figure 3:
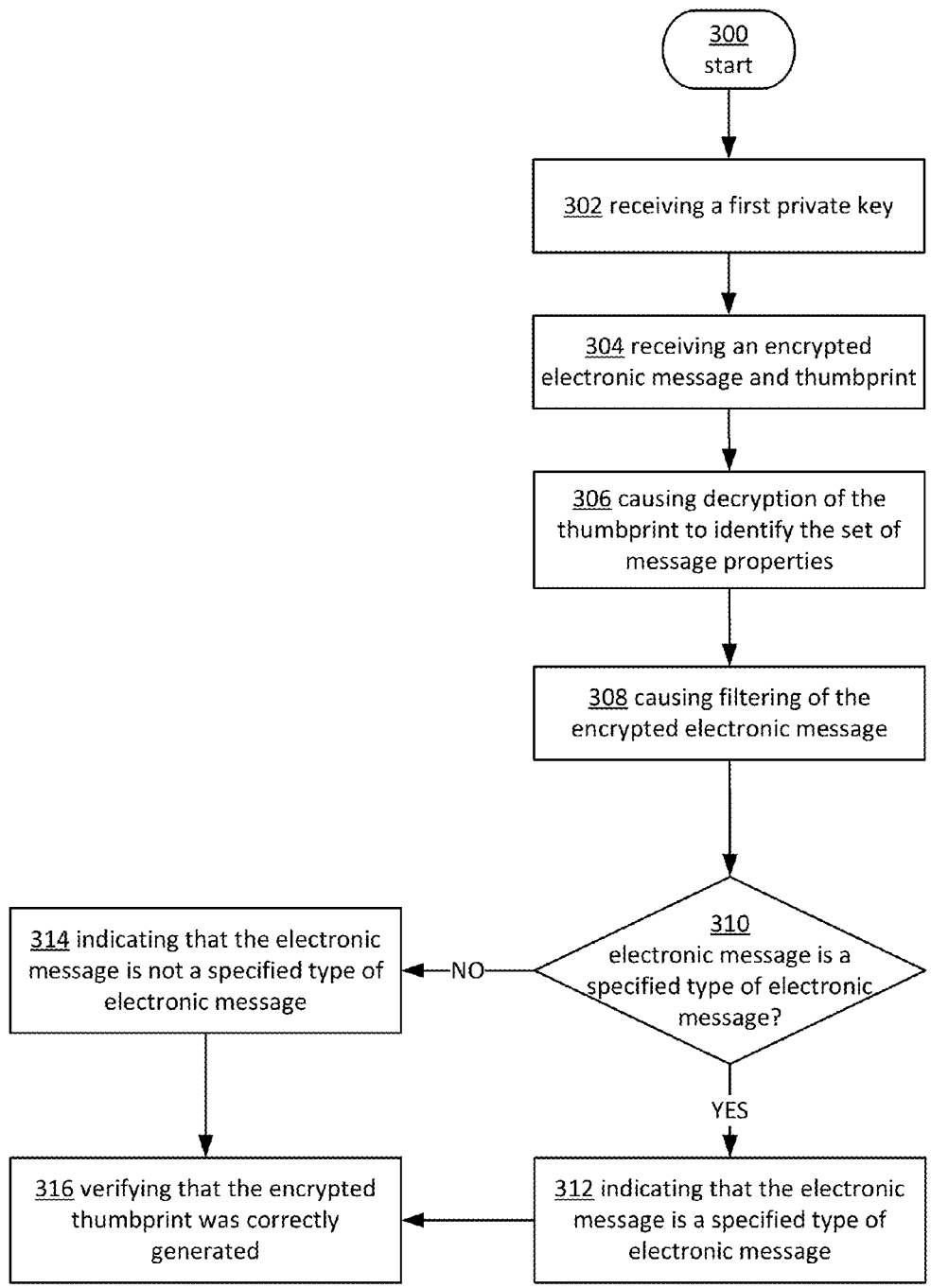
FIG. 3 is a flowchart of one embodiment of a process for providing an encrypted message mechanism.

FIG. 3 illustrates an example operational procedure for encrypting messages. Referring to FIG. 3, operation 300 begins the operational procedure. Operation 300 may be followed by operation 302. Operation 302 illustrates receiving a first private key of an encryption key group. In one embodiment, the encryption key group may comprise a first public key operable to encrypt an electronic message. The encryption key group may also comprise the first private key which may be operable to decrypt a set of message properties for the electronic message. The encryption key group may also comprise a second private key operable to decrypt an entirety of the electronic message. The set of message properties may correspond to a message thumbprint that preserves certain properties of the electronic message without allowing for the possibility of reconstructing the electronic message from the thumbprint. Operation 302 may be followed by operation 304. Operation 304 illustrates receiving an encrypted electronic message and thumbprint. As discussed above, the thumbprint may be operable to identify the set of message properties for the encrypted electronic message without reconstructing the entirety of the electronic message.

Operation 304 may be followed by operation 306. Operation 306 illustrates causing decryption of the thumbprint using the first private key to identify the set of message properties. Operation 306 may be followed by operation 308. Operation 308 illustrates causing filtering of the encrypted electronic message using the set of message properties to determine whether the electronic message is a specified type of electronic message. For example, the set of message properties can be used to determine if the electronic message is junk mail, spam, malware, or other unwanted communications. If it is determined the electronic message is a specified type of electronic message in operation 310, then operation 310 may be followed by operation 312. Operation 312 illustrates indicating that the electronic message is a specified type of electronic message. For example, an indication such as a Boolean flag may be provided indicating whether the encrypted message 240 is suspected of being an unwanted message. If the electronic message is not a specified type of electronic message, then operation 310 may be followed by operation 314. Operation 314 illustrates indicating that the electronic message is not a specified type of electronic message. Operations 312 and 314 may be followed by operation 316. Operation 316 illustrates verifying that the encrypted thumbprint was correctly generated based on the electronic message.

Figure 4:
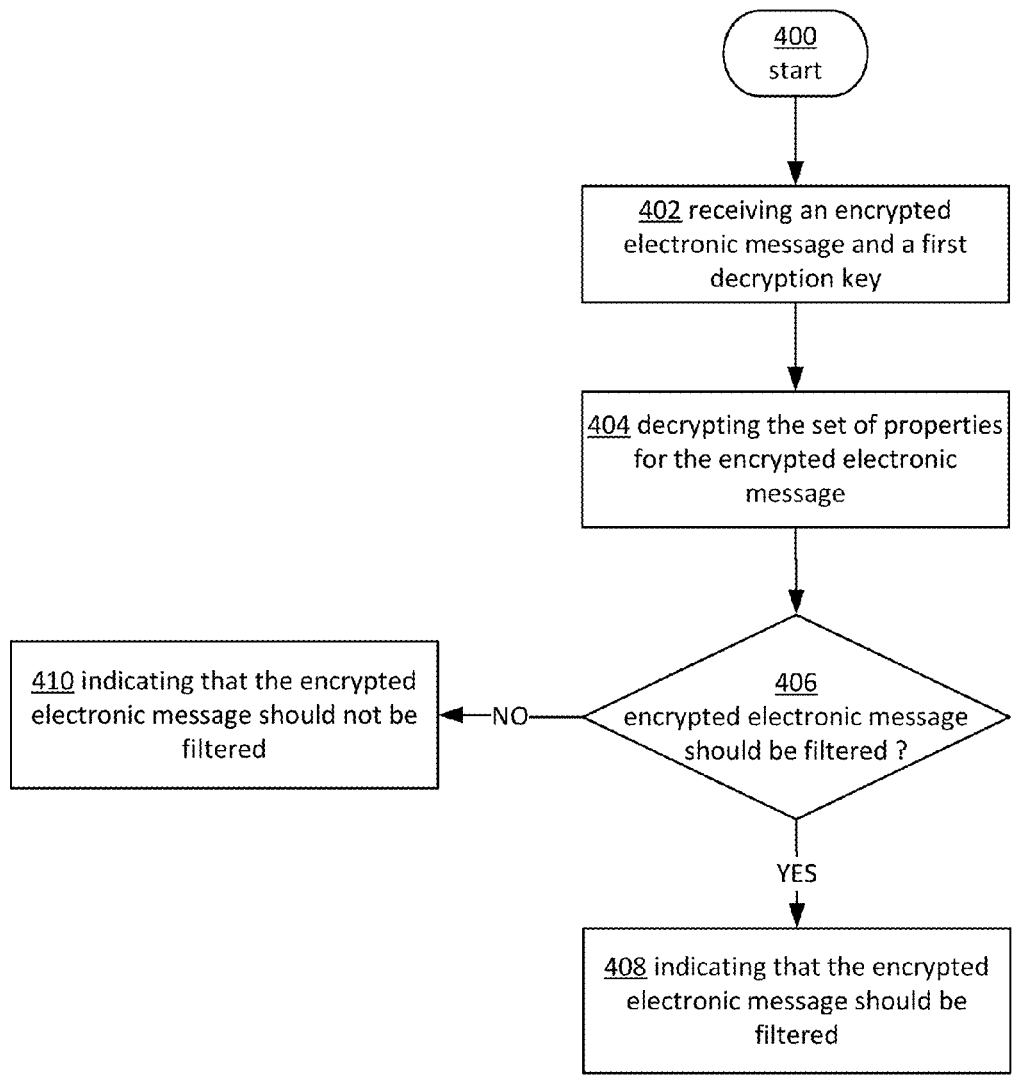
FIG. 4 is a flowchart of one embodiment of a process for providing an encrypted message mechanism.

FIG. 4 illustrates another example operational procedure for encrypting messages. Referring to FIG. 4, operation 400 begins the operational procedure. Operation 400 may be followed by operation 402. Operation 402 illustrates receiving an encrypted electronic message and a first decryption key of a public-private key group. In one embodiment, the first decryption key may be operable to decrypt a set of properties for the encrypted electronic message without decrypting the encrypted electronic message. The encrypted electronic message and the set of message properties may encrypted using one or more encryption keys of the public-private key group. Operation 402 may be followed by operation 404. Operation 404 illustrates decrypting the set of properties for the encrypted electronic message using the first decryption key.

Operation 404 may be followed by operation 406. Operation 406 illustrates determining that the encrypted electronic message should be filtered using the decrypted set of properties. For example, it can be determined that the encrypted electronic message is an unwanted message and that the message should be quarantined. If the encrypted electronic message should be filtered, then operation 406 may be followed by operation 408. Operation 408 illustrates indicating that the encrypted electronic message should be filtered. If the electronic message should not be filtered, then operation 406 may be followed by operation 410. Operation 410 illustrates indicating that the encrypted electronic message should not be filtered.

Figure 5:
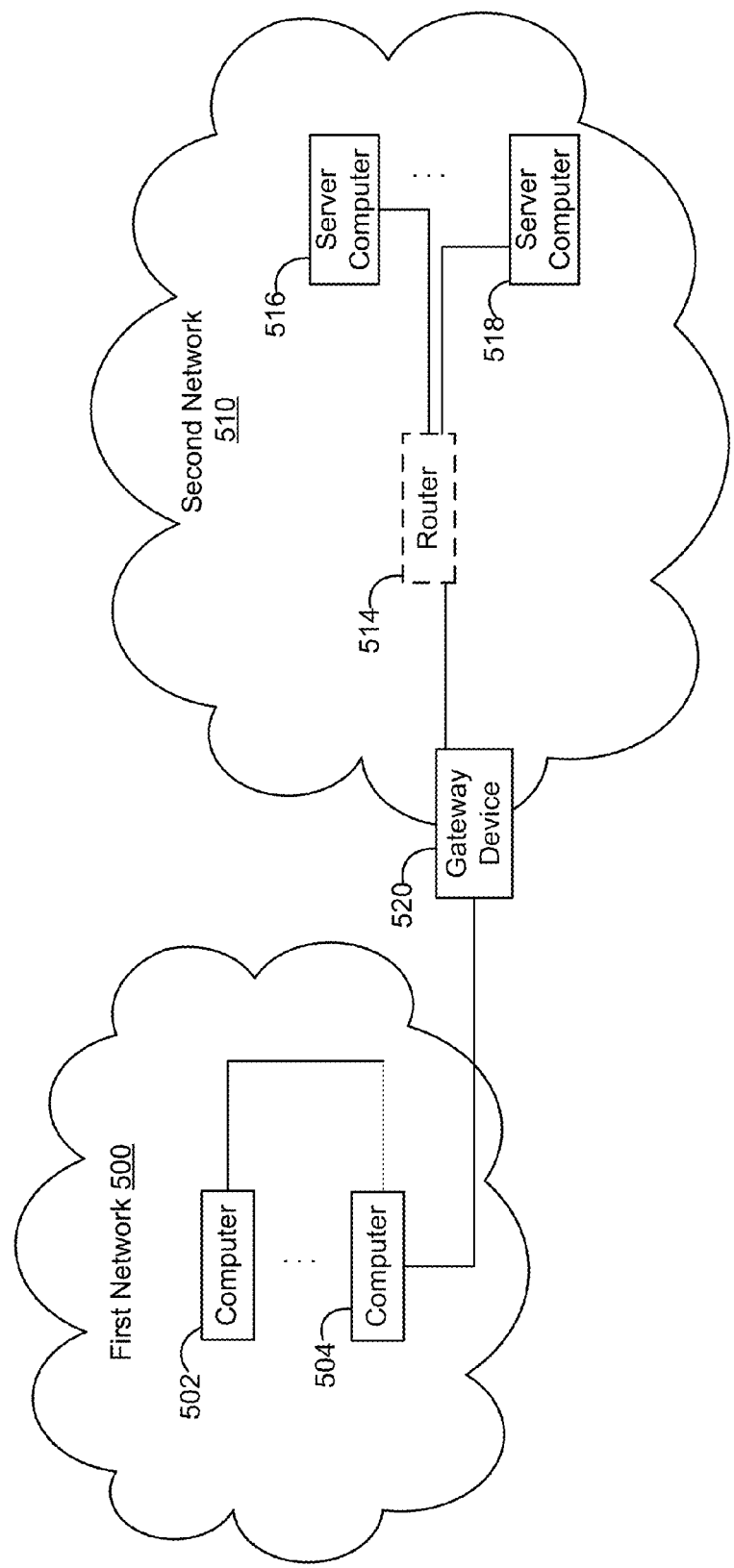
FIG. 5 is a block diagram illustrating an exemplary computer system that may be used in some embodiments.

FIG. 5 illustrates one example of an environment including a group of computing systems in which aspects of the present disclosure may be implemented. As shown in FIG. 5, the example includes a second network 510 that includes server computers 516 and 518. In particular, second network 510 may be connected to a first network 500 external to second network 510. First network 500 may provide access to computers 502 and 504.

First network 500 may be, for example, a publicly accessible network made up of multiple networks operated by various entities such as the Internet. Second network 510 may be, for example, a company network that is wholly or partially inaccessible from computing systems external to second network 510. Computers 502 and 504 may include, for example, home computing systems that connect directly to the Internet (e.g., via a cable modem or a Digital Subscriber Line (DSL)).

In addition to server computers 516 and 518 of second network 510, second network 510 may include a gateway 520 as discussed above. Second network 510 may further include additional networking devices such as a router 514. Router 514 may manage communications within second network 510, for example by forwarding packets or other data communications as appropriate based on characteristics of such communications (e.g., header information including source and/or destination addresses, protocol identifiers, etc.) and/or the characteristics of the second network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

Referring to FIG. 5, server computers 516 and 518 are part of second network 510, and each server computer may be assigned a network address (not shown) in accordance with second network 510. For example, the second network addresses may be unique with respect to the second network but not guaranteed to be unique with respect to other computing systems that are not part of second network 510. As one example, Internet Protocol (IP) and other networking protocols may reserve groups or blocks of network addresses, with such reserved network addresses not being routable over networks external to the second network 510. In such situations, different networks may each use the same network addresses within their networks, as the network addresses are locally unique to each network, but those network addresses may not be used for communications between a computing system of a different network and another computing system external to the network. IP addresses are used to illustrate some example embodiments in the present disclosure. However, it should be understood that other network addressing schemes may be applicable and are not excluded from the scope of the present disclosure.

In this example, to facilitate communications between server computers 516 and 518 of second network 510 and other external computing systems that are not part of second network 510 (e.g., computers 502 and 504 and/or other computing systems that are part of first network 500), one or more gateway devices 520 may be used. In particular, one or more first network 500 addresses (not shown) may have previously been assigned for use in representing second network 510. Such first network addresses may be routable over the Internet such that a communication that is sent by external computer 502 and that has one of second network 510's first network addresses as its destination network address will be routed over the Internet to gateway device 520. Furthermore, additional gateway devices (not shown) may be provided as needed.

Gateway device 520 may operate to manage both incoming communications to the second network 510 from first network 500 and outgoing communications from second network 510 to first network 500. For example, if server computer 516 sends a message (not shown) to one of computers 502 in first network 500, server computer 516 may create an outgoing communication that includes an external first network address (e.g., a public IP address) for computer 502 as the destination address and include a second network address (e.g., a private IP address) for server computer 516 as the source network address. Router 514 then uses the destination address of the outgoing message to direct the message to gateway device 520 for handling. In particular, in order to allow computer 502 to reply to the outgoing message, gateway device 520 may temporarily map one of the public network addresses for second network 510 to server computer 516 and modify the outgoing message to replace the source network address with the mapped first network address. Gateway device 520 may then update its mapping information with the new mapping, and forward the modified outgoing message to the destination computer 502 over the Internet.

If computer 502 responds to the modified outgoing message by sending a response incoming message (not shown) that uses the mapped first network address for server computer 516 as the destination network address, the response incoming message may be directed over the Internet to gateway device 520. Gateway device 520 may then perform similar processing in reverse to that described above for the outgoing message. In particular, gateway device 520 may use its mapping information to translate the mapped first network address into the second network address of server computer 516, modify the destination network address of the response incoming message from the mapped first network address to the second network address of server computer 516, and forward the modified incoming message to server computer 516. In this manner, at least some of the internal computers of second network 510 may communicate with external computing systems via temporary use of the first network addresses. Furthermore, in some situations, one or more of the internal computing systems of second network 510 may be mapped to use one of the first network addresses (e.g., to a unique combination of a first network address and a port number), such that external computing systems may initiate new incoming messages to the internal computing system by directing the new incoming messages to the mapped representative first network address/port as the destination network address of the new incoming messages.

Figure 6:
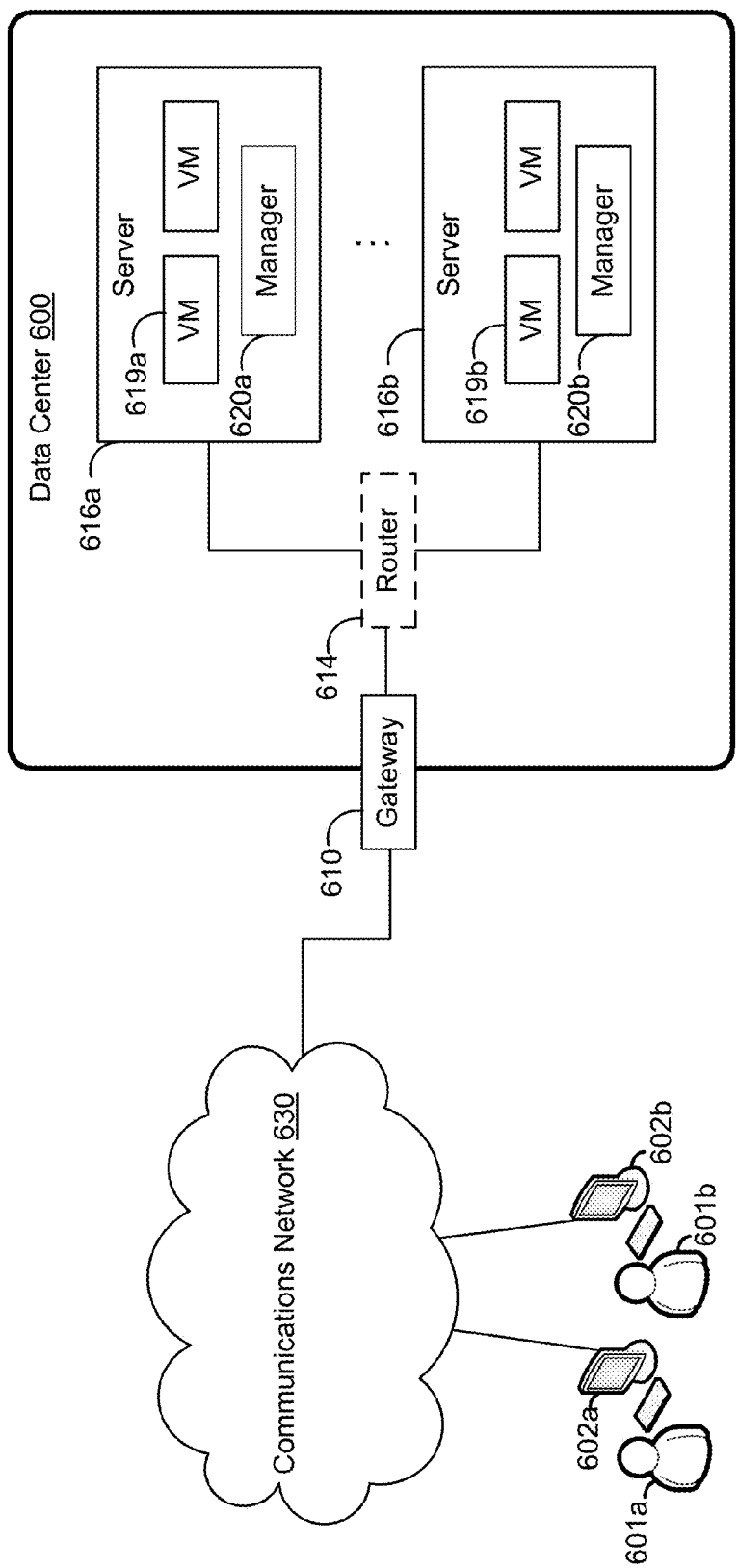
FIG. 6 is a block diagram illustrating an exemplary computer system that may be used in some embodiments.

FIG. 6 depicts an example computing environment wherein aspects of the present disclosure can be implemented. Referring to FIG. 6, communications network 630 may, for example, be a publicly accessible network of linked networks and possibly operated by various distinct parties, such as the Internet. In other embodiments, communications network 630 may be a private network, such as, for example, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by customers 601 or other customers of data center 600. For instance, user computer 602a or 602b may be a server, a desktop or laptop personal computer, a tablet computer, a wireless telephone, a personal digital assistant (PDA), an e-book reader, a game console, a set-top box, or any other computing device capable of accessing data center 600. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 600. In this regard, data center 600 might provide a Web interface through which aspects of its operation may be configured through the use of a Web browser application program executing on user computers 602. Alternatively, a stand-alone application program executing on user computers 602 might access an application programming interface (API) exposed by data center 600 for performing the configuration operations. Other mechanisms for configuring the operation of the data center 600, including deploying updates to an application, might also be utilized.

Servers 616 shown in FIG. 6 may be standard servers configured appropriately for providing the computing resources described above and may provide computing resources for executing one or more applications. In one embodiment, the computing resources may be virtual machine instances 619. In the example of virtual machine instances 619, each of the servers 616 may be configured to execute an instance manager 620a or 620b capable of executing the virtual machine instances 619. The instance managers 620 may be a virtual machine monitor (VMM) or another type of program configured to enable the execution of virtual machine instances 619 on servers 616, for example. As discussed above, each of the virtual machine instances 619 may be configured to execute all or a portion of an application.

It should be appreciated that this example describes a computing environment providing virtual machine instances, other types of implementations can be utilized with the concepts and technologies disclosed herein. For example, the embodiments disclosed herein might also be utilized with computing systems that do not utilize virtual machine instances.

In the example data center 600 shown in FIG. 6, a router 614 may be utilized to interconnect the servers 616a and 616b. Router 614 may also be connected to gateway 610 which is connected to communications network 630. Router 614 may manage communications within networks in data center 600, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In some embodiments, one or more of the virtual machine instances 619 of data center 600 may form part of one or more networks. In some embodiments, gateway 610 may be used to provide network address translation (NAT) functionality to a group of virtual machine instances and allow the virtual machine instances of the group to use a first group of internal network addresses to communicate over a shared internal network and to use a second group of one or more other external network addresses for communications between virtual machine instances of the group and other computing systems or virtual machine instances that are external to the group. An IP address is one example of a network address that is particularly applicable to the TCP/IP context in which some embodiments of the present disclosure can be implemented. The use of IP addresses herein is intended to be illustrative of network addresses and not limiting as to the scope of the described concepts.

Virtual machine instances 619 may be assigned a private network address (not shown). For example, the private network addresses may be unique with respect to their respective private networks but not guaranteed to be unique with respect to other computing systems that are not part of the private network. IP addresses are used to illustrate some example embodiments in the present disclosure. However, it should be understood that other network addressing schemes may be applicable and are not excluded from the scope of the present disclosure.

Gateway 610 may operate to manage both incoming communications to data center 600 from communication network 630 and outgoing communications from data center 600 to communication network 630. For example, if virtual machine instance 619a sends a message (not shown) to computer 602a, virtual machine instance 619a may create an outgoing communication that includes network address on a first network (e.g., an external public IP address) for computer 602a as the destination address and include a network address on a second network (e.g., a private IP address) for virtual machine instance 619a as the source network address. Router 614 may then use the destination address of the outgoing message to direct the message to gateway 610 for handling. In particular, in order to allow computer 602a to reply to the outgoing message, gateway 610 may temporarily map one of the public network addresses for data center 600 to virtual machine instance 619a and modify the outgoing message to replace the private network address for the source network address with the mapped public network address. Gateway 610 may then update its mapping information with the new mapping, and forward the modified outgoing message to computer 602a over the Internet.

If computer 602a responds to the modified outgoing message by sending a response incoming message (not shown) that uses the mapped public network address for virtual machine instance 619a as the destination network address, the response incoming message may be directed over the Internet to gateway 610. Gateway 610 may then perform similar processing in reverse to that described above for the outgoing message. In particular, gateway 610 may use its mapping information to translate the mapped public network address into the private network address of virtual machine instance 619*a*, modify the destination network address of the response incoming message from the mapped public network address to the private network address of virtual machine instance 619*a*, and forward the modified incoming message to virtual machine instance 619*a*. In this manner, at least some of the internal computers of data center 600 may communicate with external computing systems via temporary use of the public network addresses. Furthermore, in some situations, one or more of the internal computing systems of data center 600 may be mapped to use one of the public network addresses (e.g., to a unique combination of a public network address and a port number), such that external computing systems may initiate new incoming messages to the internal computing system by directing the new incoming messages to the mapped representative public network address/port as the destination network address of the new incoming messages.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 600 described in FIG. 6 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
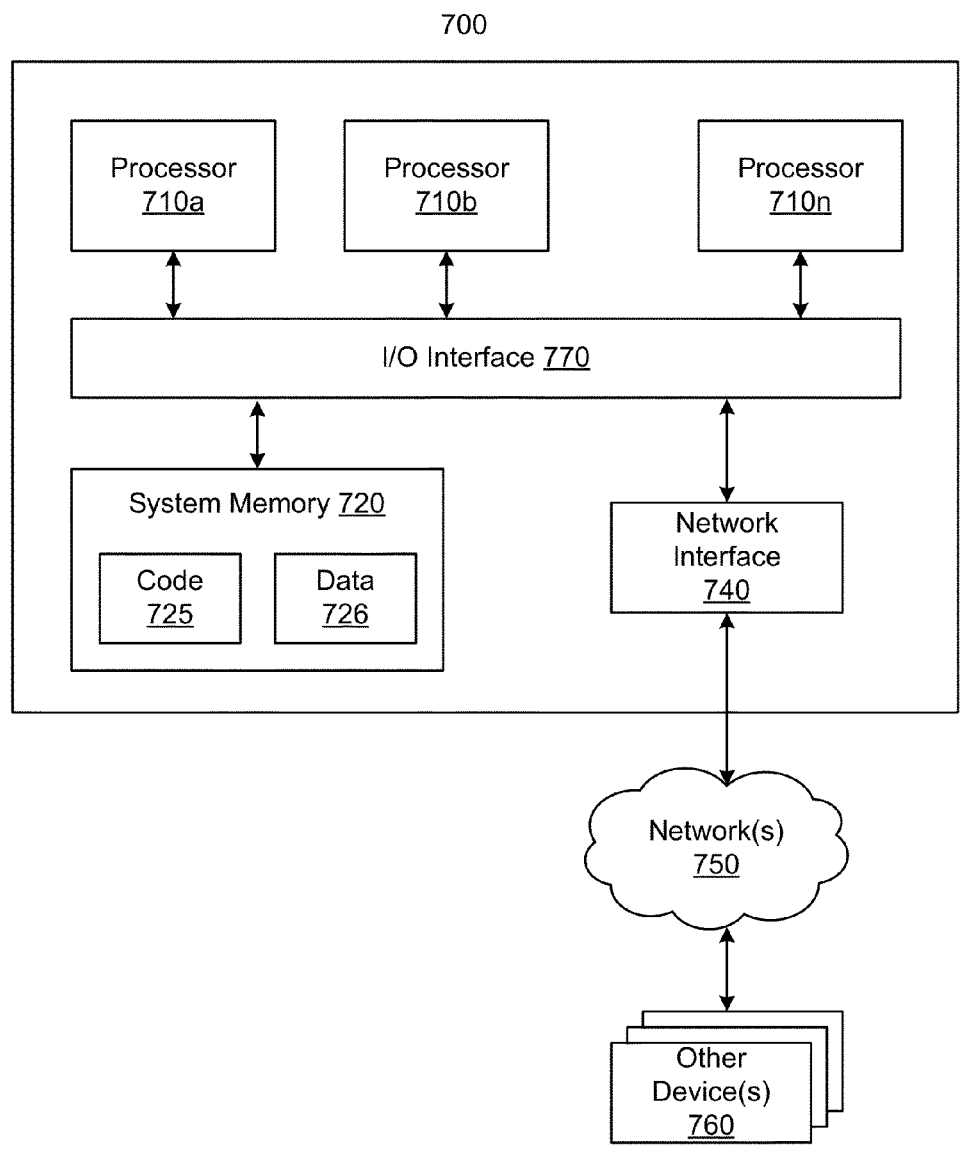
FIG. 7 is a block diagram illustrating an exemplary computing device that may be used in some embodiments.

In at least some embodiments, a server that implements a portion or all of one or more of the technologies described herein, including the techniques to implement the functionality of a mail filter and messaging services may include a general-purpose computer system that includes or is configured to access one or more computer-accessible media. FIG. 7 illustrates such a general purpose computing device 700. In the illustrated embodiment, computing device 700 includes one or more processors 710*a*, 710*b*, and/or 710*n* (which may be referred herein singularly as "a processor 710" or in the plural as "the processors 710") coupled to a system memory 720 via an input/output (I/O) interface 370. Computing device 700 further includes a network interface 740 coupled to I/O interface 370.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 720 as code 725 and data 726.

In one embodiment, I/O interface 770 may be configured to coordinate I/O traffic between processor 710, system memory 720 and any peripheral devices in the device, including network interface 740 or other peripheral interfaces. In some embodiments, I/O interface 770 may perform any necessary protocol, timing or other data transformations to convert data signals from one component (e.g., system memory 720) into a format suitable for use by another component (e.g., processor 710). In some embodiments, I/O interface 370 may include support for devices attached through various types of peripheral buses, such as a variant of the Peripheral Component Interconnect (PCI) bus standard or the Universal Serial Bus (USB) standard, for example. In some embodiments, the function of I/O interface 370 may be split into two or more separate components, such as a north bridge and a south bridge, for example. Also, in some embodiments some or all of the functionality of I/O interface 370, such as an interface to system memory 720, may be incorporated directly into processor 710.

Network interface 740 may be configured to allow data to be exchanged between computing device 700 and other device or devices 760 attached to a network or networks 750, such as other computer systems or devices as illustrated in FIGS. 5 and 6, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1 through 6 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 770. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via a network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It will be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc.

In some embodiments, a system memory may be used which is one embodiment of a computer readable storage medium configured to store program instructions and data as described above for FIGS. 1-7 for implementing embodiments of the corresponding methods and apparatus. Portions or all of the multiple computer systems such as those illustrated herein may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of the inventions disclosed herein.

What is claimed is:

1. A computer implemented method for message filtering by a service provider, comprising:
   receiving an encrypted electronic message and a first decryption key of a public-private key group, the first decryption key operable to decrypt a set of properties associated with the encrypted electronic message without decrypting the entire encrypted electronic message, wherein the encrypted electronic message and the set of properties are encrypted using an encryption key of the public-private key group and wherein the public-private key group includes a second decryption key operable to decrypt the entire encrypted electronic message, and wherein the set of properties is accessible in a partially-obscured form of the encrypted electronic message;
decrypting the set of properties for the encrypted electronic message using the first decryption key without decrypting the entire encrypted electronic message;
using the decrypted set of properties to determine characteristics of the electronic message, and based at least in part on the determined characteristics, determining a filter result for the encrypted electronic message; and
sending the encrypted electronic message and the filter result.

2. The method of claim 1, wherein the set of properties is based on a message thumbprint usable to generate the set of message properties without allowing for reconstruction of the electronic message from the message thumbprint.

3. The method of claim 2, wherein the message thumbprint incorporates statistical properties usable to make filtering determinations using a heuristic function.

4. The method of claim 2, wherein the message thumbprint comprises a dictionary of words included in the electronic message.

5. The method of claim 2, wherein the message thumbprint comprises a weighted suffix tree based on words included in the electronic message.

6. The method of claim 2, wherein the message thumbprint comprises a Markov model based on content of the electronic message.

7. The method of claim 2, wherein the electronic message and the message thumbprint are received as a concatenated group.

8. The method of claim 7, wherein the concatenated group comprises a multi-part multipurpose internet mail extensions (MIME) message.

9. The method of claim 7, wherein the concatenated group is formed by using a first encryption key to encrypt the electronic message and a second encryption key to encrypt the message thumbprint and the encrypted electronic message.

10. The method of claim 1, wherein the filtering comprises determining that the electronic message is junk mail, spam, malware, or other unwanted communications.

11. The method of claim 1, further comprising providing a notification of the filtering.

12. The method of claim 11, wherein said providing the notification comprises providing a hash of the set of properties, the hash usable to verify that the encrypted electronic message was correctly filtered.

13. A computing system for message filtering, the system comprising:
at least one computing device; and
at least one memory having stored thereon computer readable instructions that, upon execution by the system, cause the system to at least:
receive an encrypted electronic message and a first decryption key of a key group, the first decryption key operable to decrypt a set of properties associated with the encrypted electronic message without decrypting the entire encrypted electronic message, wherein the encrypted electronic message and the set of properties are encrypted using an encryption key of the key group and wherein the key group includes a second decryption key operable to decrypt the entire encrypted electronic message, and wherein the set of properties is accessible in a partially-obscured form of the encrypted electronic message;
decrypt the set of properties for the encrypted electronic message using the first decryption key without decrypting the entire encrypted electronic message;
using the decrypted set of properties to determine characteristics of the electronic message, and based at least in part on the determined characteristics, determining a filter result for the encrypted electronic message; and
sending the encrypted electronic message and the filter result.

14. The computing system according to claim 13, wherein the set of message properties comprise statistical properties usable to determine whether the encrypted electronic message should be filtered using a heuristic function.

15. A computer-readable storage medium having stored thereon computer-readable instructions, the computer-readable instructions comprising instructions that upon execution on a computing system, at least cause:
receiving an encrypted electronic message and a first decryption key of a key group, the first decryption key operable to decrypt a set of properties associated with the encrypted electronic message without decrypting the encrypted electronic message, wherein the encrypted electronic message and the set of properties are encrypted using an encryption key of the key group and wherein the key group includes a second decryption key operable to decrypt the encrypted electronic message, and wherein the set of properties is accessible in a partially-obscured form of the encrypted electronic message;
decrypting the set of properties for the encrypted electronic message using the first decryption key without decrypting the encrypted electronic message;
using the decrypted set of properties to determine characteristics of the electronic message, and based at least in part on the determined characteristics, determining a filter result for the encrypted electronic message; and
sending the encrypted electronic message and the filter result.

16. The computer-readable storage medium of claim 15, wherein the set of properties is based on a message thumbprint usable to generate the set of message properties without allowing for reconstruction of the electronic message from the message thumbprint.

17. The computer-readable storage medium of claim 16, wherein the message thumbprint incorporates statistical properties usable to make filtering determinations using a heuristic function.

18. The computer-readable storage medium of claim 15, further comprising instructions that upon execution on the computing system, at least cause the computing system to provide a notification of the filtering.

19. The computer-readable storage medium of claim 18, wherein said providing the notification comprises providing a hash of the set of properties, the hash usable to verify that the encrypted electronic message was correctly filtered.

* * * * *